United States Patent

Slack et al.

[11] Patent Number: 6,145,846
[45] Date of Patent: Nov. 14, 2000

[54] METAL-TO-METAL SEAL IN HIGH PRESSURE APPLICATIONS WITH LOW CONTACT STRESS

[75] Inventors: Maurice Slack; Jaroslaw Nowinka; Trent Kaiser, all of Edmonton, Canada

[73] Assignee: Centre for Engineering Research Inc., Edmonton, Canada

[21] Appl. No.: 09/340,228

[22] Filed: Jul. 1, 1999

Related U.S. Application Data

[62] Division of application No. 08/708,430, Sep. 5, 1996, Pat. No. 5,951,019.

[51] Int. Cl.$^7$ ................................................ F16J 15/46
[52] U.S. Cl. ........................ 277/550; 277/551; 277/607; 285/110; 285/917
[58] Field of Search ................................ 277/309, 311, 277/314, 315, 550, 551, 607, 626, 634; 285/95, 107, 109, 110, 917

[56] References Cited

U.S. PATENT DOCUMENTS

| | | |
|---|---|---|
| 1,302,022 | 4/1919 | Drewry . |
| 2,405,152 | 8/1946 | Kilchenmann . |
| 3,054,422 | 9/1962 | Napalitano . |
| 3,214,198 | 10/1965 | Peuchmaur . |
| 3,891,224 | 6/1975 | Ditcher . |
| 4,244,521 | 1/1981 | Guse . |
| 4,473,230 | 9/1984 | Adamek . |
| 4,597,596 | 7/1986 | Tozer . |
| 4,641,841 | 2/1987 | Regan . |
| 5,484,260 | 1/1996 | Brandon . |
| 5,711,550 | 1/1998 | Brandt . |
| 5,746,453 | 5/1998 | Roberts . |
| 5,924,742 | 7/1999 | Butigieg . |
| 5,941,536 | 8/1999 | Hill . |

OTHER PUBLICATIONS

Wood Group, "Wood Groups Inline Expansion Joint Tested", Apr. 1997, 6 pgs.

*Primary Examiner*—Anthony Knight
*Assistant Examiner*—John L. Beres
*Attorney, Agent, or Firm*—Davis and Bujold

[57] ABSTRACT

A method of forming a metal-to-metal seal in high pressure applications with low contact stress. Firstly, providing a first elongate pressure containment member having a surface of revolution. Secondly, providing a second elongate pressure containment member having an exterior surface, an interior surface, a remote end, and a thin walled extension sleeve having a first end and a second end. The first end of the thin walled extension sleeve is conjoined with the second elongate pressure member at the remote end. The second elongate pressure containment member is of a greater thickness than the sleeve. Thirdly, coupling the first elongate pressure containment member and the second elongate pressure containment member with the sleeve positioned in close relation to the surface of revolution. Fourthly, placing the first elongate pressure containment member and the second elongate pressure containment member in an environment in which fluid pressure tends to cause a flow of fluids from the second end to the first end of the sleeve along an interfacial region between the sleeve and the surface of revolution. Fluid pressure tends to constrict and set up a pressure gradient which promotes sealing along the interfacial region.

16 Claims, 7 Drawing Sheets

METAL-TO-METAL SEAL IN HIGH PRESSURE APPLICATIONS WITH LOW CONTACT STRESS

This application is a divisional of U.S. application Ser. No. 08/708,430 filed Sep. 5, 1996, now U.S. Pat. No. 5,951,019.

FIELD OF THE INVENTION

The present invention relates to a method of forming a metal-to-metal seal in high pressure applications with low contact stress incorporating fault tolerant secondary control of leakage rates. This method has particular application for connections between tubular members, where there is relative movement between the tubular members.

BACKGROUND OF THE INVENTION

In high pressure applications, metal-to-metal contact seals are preferred over elastomeric seals. To achieve adequate sealing, contact seals typically require that the contact stress exceed the pressure to be contained over a given sealing width. Contact seals used in high pressure tubular fittings, typically have initial make-up interference contact stresses at least an order of magnitude greater than the maximum pressure to be contained and distributed over very narrow widths to obtain adequate reliability. Calculations of the necessary contact stress are routinely performed using stress analysis methods such as finite element analysis.

Unfortunately, there are many applications in which it is desirable that the contact stress be minimized in order to facilitate assembly, sliding, rotation or other operations. In such applications, the high contact stress of metal-to-metal contact seals make them undesirable, as it inevitably leads to higher friction forces during relative movements and greatly increased potential for galling or other damage which can initiate seal failure.

SUMMARY OF THE INVENTION

What is required is a method of forming a metal-to-metal seal in high pressure applications with low contact stress.

According to the present invention there is provided a method of forming a metal-to-metal seal in high pressure applications with low contact stress. Firstly, providing a first elongate pressure containment member having a surface of revolution. Secondly, providing a second elongate pressure containment member having an exterior surface, an interior surface, a remote end, and a thin walled extension sleeve having a first end and a second end. The first end of the thin walled extension sleeve is conjoined with the second elongate pressure member at the remote end. The second elongate pressure containment member is of a greater thickness than the sleeve. Thirdly, coupling the first elongate pressure containment member and the second elongate pressure containment member with the sleeve positioned in close relation to the surface of revolution. Fourthly, placing the first elongate pressure containment member and the second elongate pressure containment member in an environment in which fluid pressure tends to cause a flow of fluids from the second end to the first end of the sleeve along an interfacial region between the sleeve and the surface of revolution. Fluid pressure tends to constrict and set up a pressure gradient which promotes sealing along the interfacial region.

With seals normally used in high pressure applications, high contact stress is concentrated over a narrow sealing width. With the present method, the teaching is exactly the opposite; a comparatively low contact stress is distributed over a wide sealing width. This teaching exploits the relationship between width and maximum contact stress. As the contact width is increased, the average contact stress is decreased. This teaching allows an interference fit to be provided, with a lower average contact stress.

Formulas necessary for the calculation of necessary contact stress in high pressure applications are published by the American Petroleum Institute. These formulas all teach that the contact stress must be greater than the pressure to be contained in order to avoid seal failure. In accordance with the teachings of the present method, the initial contact stress between the sleeve and the surface of revolution can be less than required to maintain contact stress greater than the contained pressure over the full intended pressure range. There can even be an initial gap, that is closed and sealed by fluid pressure.

There are numerous ways of securing the sleeve to the second pressure containment member. Sleeve can be secured by welding, clamping, or with various fasteners. In view of the high pressure applications for which the present method is intended, it is preferred that the sleeve be intregally formed as part of the second elongate pressure containment member.

It is important that there be a clear differentiation in the thickness of the sleeve and the thickness of the second elongate pressure containment member. The sleeve cannot merely be a gradually tapered extension of the second elongate pressure containment member, and still work as intended. It is, therefore, preferred that the first end of the sleeve be conjoined to the remote end of the second elongate pressure containment member over an interval of length not greater than one thickness of the second elongate pressure containment member.

Although beneficial effects may be obtained through the use of the method, as described above, where there is a gap, a portion of the length of the sleeve is required to compensate for the gap and this can adversely effect the sleeves ability to seal in response to fluid pressure. Even more beneficial effects may, therefore be obtained when a circumferential notch is placed near the remote end of the second elongate pressure containment member on the side where the fluid pressure is less. The notch provides for some additional flexibility which makes the sleeve more responsive to fluid pressure.

In accordance with another aspect of the present invention there is provided a seal assembly which includes a first elongate tubular member having a surface of revolution. A second elongate tubular member is provided having an exterior surface, an interior surface and a remote end. A thin walled extension sleeve is provided having a first end and a second end. The first end of the thin walled extension sleeve is conjoined with the remote end. The second elongate tubular member is telescopically received within the first elongate tubular member with the sleeve positioned in close relation to the surface of revolution.

Although beneficial effects may be obtained through the seal assembly, as described above, even better performance may be obtained from the seal assembly when the second elongate tubular member has a notch in the exterior surface adjacent the remote end.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method of forming a metal-to-metal seal in high pressure applications with low contact stress will now be described with reference to FIGS. 1 through 7.

Firstly, provide a first elongate pressure containment member 12 having a surface of revolution 14.

Figure 1:
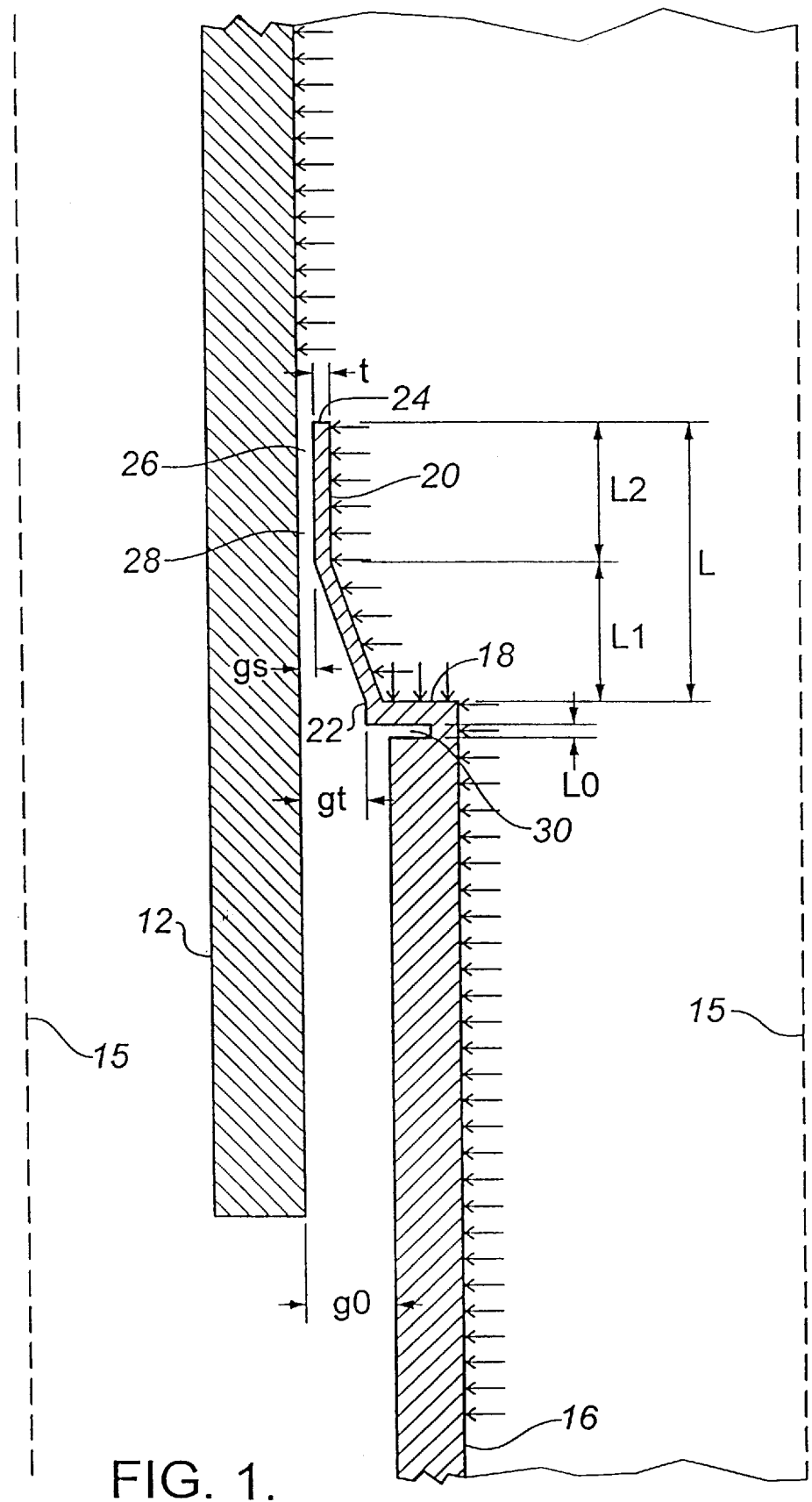
FIG. 1 is a side elevation view, in section, of a metal-to-metal seal constructed in accordance with the teaching of the present invention.

Secondly, provide a second elongate pressure containment member 16 having an exterior surface 17, an interior surface 19 and a remote end 18. In FIG. 1, first elongate pressure containment member 12 and second elongate pressure containment member 16 are tubular members. This is a typical application for this method of sealing, although there are some applications in which they need not be tubular members. Second elongate pressure containment member 16 has a thin walled extension sleeve 20 having a first end 22 and a second end 24. First end 22 of thin walled extension sleeve 20 is conjoined with remote end 18 of second elongate pressure member 16. Sleeve 20 can be conjoined with second elongate member 16 by welding and forming or machining from a single piece of material. In view of the intended high pressure applications, it is preferred that sleeve 20 be integrally formed as part of second elongate pressure member 16 by machining from a single piece of material. Second elongate pressure containment member 16 is of a greater thickness than sleeve 20. Second end 24 of sleeve 20 projects past remote end 18. Depending on the requirements of the application a notch 30 may be provided near remote end 18. Notch 30 is placed so that it is exposed to the low pressure. In the intended application, as will be further described in relation to FIG. 2, interior surface 19 is subjected to fluid pressure that is high when compared to exterior surface 17. Notch 30 is, therefore, illustrated on exterior surface 17 adjacent remote end 18.

Thirdly, couple first elongate pressure containment member 12 and second elongate pressure containment member 16 with sleeve 20 positioned in close relation to surface of revolution 14. In the illustrated embodiment, second elongate pressure containment member 16 has been telescopically inserted into first elongate pressure containment member 12. Contrary to API recommended practice guidelines for sealing between overlapping 'cylindrical' members, the initial contact stress between sleeve 20 and surface of revolution 14 may be less than required to maintain contact stress greater than the contained pressure over the full pressure range. In fact, there may be a gap 26 between sleeve 20 and surface of revolution 14, as will hereinafter be further described.

Fourthly, place first elongate pressure containment member 12 and second elongate pressure containment member 16 in an environment in which fluid pressure tends to cause a flow of fluids from second end 24 to first end 22 of sleeve 20 along an interfacial region 28 between sleeve 20 and surface of revolution 14. Fluid pressure tends to constrict and set up a pressure gradient along interfacial region 28 sufficient to seal interfacial region 28. Where a notch 30 is included, fluid pressure, acting largely in the axial direction, has the further tendency to constrict the interfacial region and control the sealing contact stress distribution.

Once the underlying principles of the described method are understood, it will be appreciated that the length and thickness of sleeve 20 required to achieve the desired result will vary with the application, as will the width and depth of the notch 30 if included. Certain of these variables can, however, be reduced to a formula:

$$L > L_1$$

where $L_1 \geq 0.2 \lambda$, without notch and $L_1 \geq 0.05 \lambda$ with notch, where $$\lambda = \frac{2\pi}{\beta} = \text{characteristic shell wavelength,}$$

$$\beta = \sqrt[4]{\frac{3(1-v^2)}{r^2 t^2}} \text{ for cylinders,}$$

r=average sleeve radius,
t=sleeve wall thickness, and
v=Poisson's ratio

With this method of sealing there can actually be an initial gap 26, as illustrated in FIG. 1, between first elongate pressure containment member 12 and sleeve 20. Where such a gap exists an initial flow through the gap must be provided for and small gap sizes may be accounted for using laminar flow assumptions in the formula:

$$L_2 > \frac{pr}{Q_{\max} 6 m_0} \oint_0^{P_0} g^3 dP$$

where, g=gap size dependent on pressure induced deformations,
m=viscosity,
P=annular pressure,
$Q_{max}$=maximum allowable seapage flow rate, and
$P_0$=applied differentia 1 pressure for maximum flow within operating pressure range.

Sealing can be enhanced, as it is in other sealing applications, by providing a weak solid interface compound, such as grease, in interfacial region 28. This alters the flow behaviour of the annular material from that of a fluid to a weak solid which mechanism may be described by the formula:

$$L_2 > \frac{1}{2}\oint_0^{P_0} \frac{g}{t} dP$$

where,
g=gap size dependent on pressure induced deformations,
t=allowable static shear strength of interfacial material,
P=annular pressure, and
$P_0$=maximum applied differential pressure.

Care must be taken in having a clear differentiation between sleeve 20 and the balance of second elongate pressure containment member 16. If the transition in thickness is gradual, there is a danger that sleeve 20 will not function as intended. Sleeve 20 has to be sufficiently thin that it will deform to seal interfacial region 28 when subjected to the pressures of the intended application. It is, therefore, to be preferred that first end 22 of sleeve 20 be connected to remote end 18 of second elongate pressure containment member 16 over an interval of length not greater than one thickness of second elongate pressure containment member 16.

The physical testing of the prototype will now be described to illustrate the utility of the present invention.

The seal will be referred to as MICS seal; MICS being an acronym for Minimal interfacial contact stress.

Figure 2:
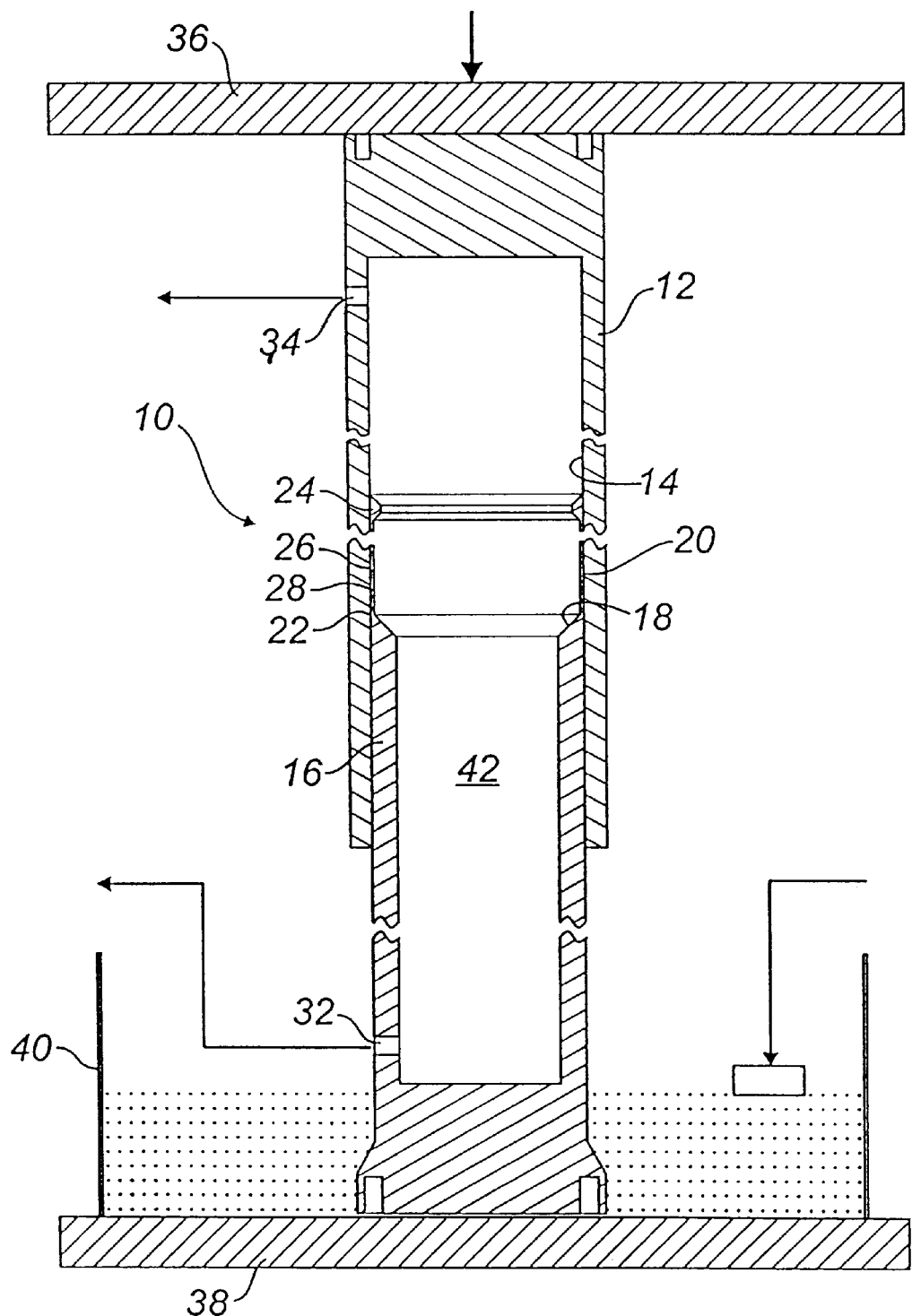
FIG. 2 is a side elevation view, in section, of the metal-to-metal seal illustrated in FIG. 1, undergoing pressure testing.
Figure 3:
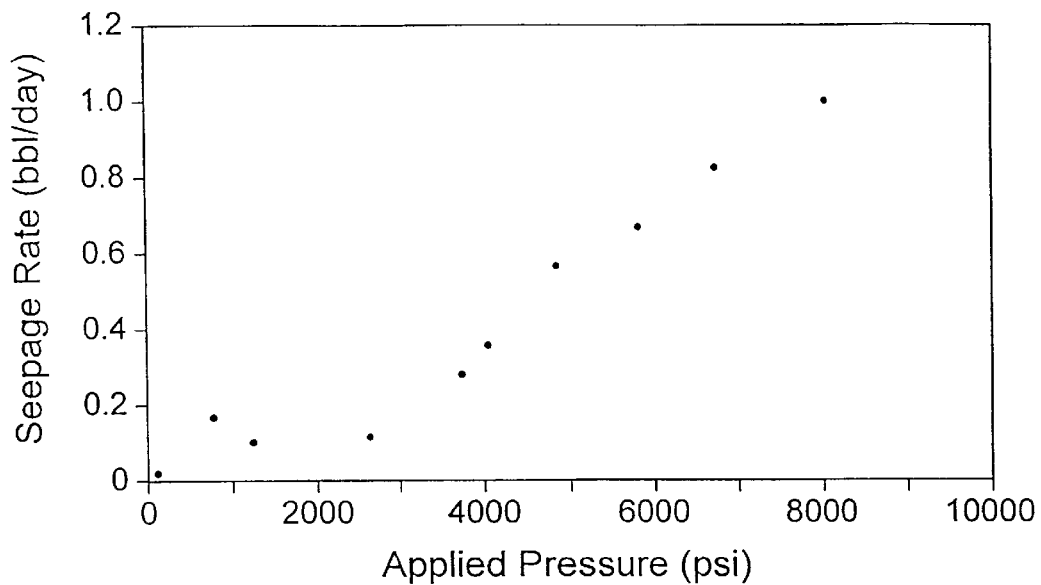
FIG. 3 is a graph setting forth seepage rates at applied pressures when the metal-to-metal seal is subjected to pressure testing, as illustrated in FIG. 2.

Referring to FIG. 2, a prototype seal assembly, generally indicated by reference numeral 10, was constructed according to the teaching of the present invention. Seal assembly 10 was the subjected to physical tests designed to verify the performance of seal 10 under the application of pressure, and friction loads associated with axial sliding along the seal surfaces.

Referring to FIG. 2, seal assembly 10 consists of first pressure containment member 12 and second pressure containment member 16. Pressure containment members 12 and 16 were formed from bars and machined long internal bore cavities. They were then telescopically connected to form a fully enclosed pressure containment unit upon assembly. Second pressure containment member 16 was machined to incorporate a 12 inch long thin walled sleeve 20 at one of its ends, remote end 18.

A radial clearance gap 26 of 0.0004 inches was provided between an outside surface of sleeve 20 and inside surface of revolution 14 of first pressure containment member 12; both of which surfaces constitute the seal area. Two holes 32 and 34 were drilled through first pressure containment member 12 and second pressure containment member 16 in order to accommodate fixtures for hydraulic lines supplying pressure fluid and connecting pressure measuring instrumentation.

Test were conducted on both a "dry" specimen and also on a specimen having seal surfaces which were lubricated with grease. First pressure containment member 12 was then lowered onto second pressure containment member 16 to a predetermined depth. The unit was placed vertically between the a top compression plate 36 and a bottom compression plate 38 of a testing machine (not shown). A fluid containment vessel 40 was attached to bottom compression plate 38 to collect leaked fluid.

The specimen was filled with water pumped into inside cavity 42 through the lower of the access holes, access hole 32. Internal pressure was applied first by adding extra pressure fluid. At each given threshold pressure the inflow line was shut off. The specimen was then compressed by the testing machine, with inside pressure building up. After the peak value was reached, the testing machine stroke was reversed, and the specimen was allowed to expand back until it reached the original threshold pressure. More water was pumped inside the specimen to bring up the pressure to the next threshold value, at which point the load cycle was repeated.

During testing, no leak was detected from the lubricated specimen at any pressure during static pressure increases, nor during load cycles with sliding up to a pressure of approximately 5,500 psi. Above this pressure, seepage was observed during compression and expansion sliding driven by the testing machine, of magnitude less than 0.15 bbl/day. Seepage rates detected from the unlubricated test under static conditions, shown in FIG. 3, exhibit an approximately linear dependence on the pressure above the activation pressure of approximately 2000 psi, with estimated leakage magnitude approximately 1 bbl/day at 8,000 psi. which is considered to be within acceptable limits.

Figure 4:
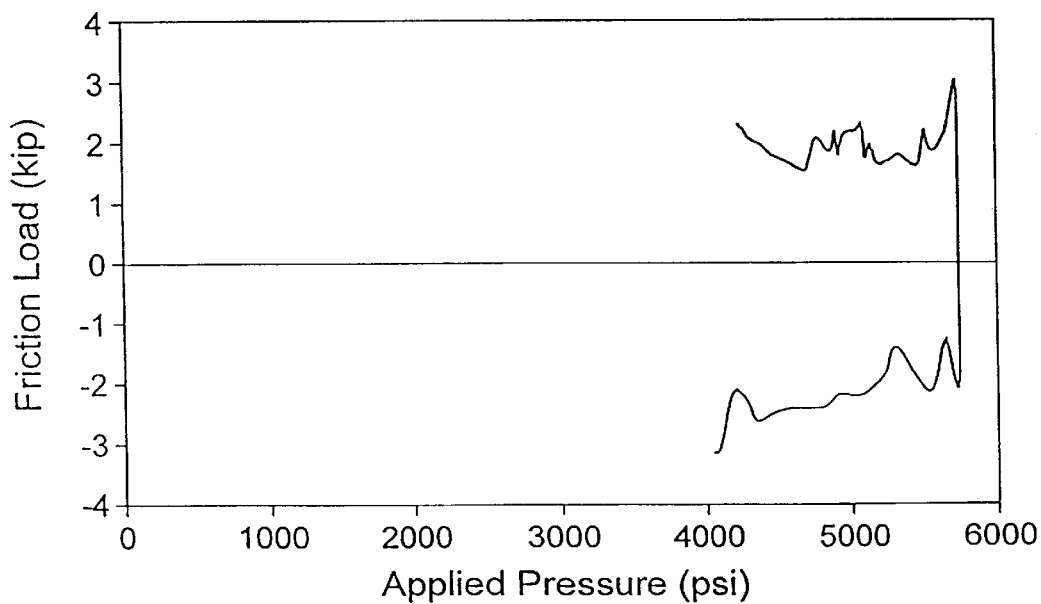
FIG. 4 is a graph setting forth friction loads at applied pressures when the metal-to-metal seal is lubricated and then subjected to pressure testing, as illustrated in FIG. 2.

FIG. 4, represents friction loads obtained during the compression of the lubricated specimen. The abscissa represents the inside pressure; the ordinate corresponds to the difference between the total sliding load and end pressure load, and is therefore a measure of friction load. Based on the above values, the friction coefficient determining friction along lubricated surfaces was estimated at 0.088. Test data obtained during specimen expansion showed a relatively smaller difference between total load and the product of inside pressure times cross-section area, indicating smaller friction loads, especially under higher pressures. Friction coefficient for dry specimen was estimated in a similar manner and found equal to approximately 0.33, with friction loads up to 30,000 lbf.

The tests verified the ability of the MICS seal to ensure pressure integrity between two tubular members subjected to internal pressures up to 9,000 psi and relative axial movement of the seal surfaces. Seepage rates obtained from the lubricated specimen during load cycles under high pressures and from the dry specimen, were very low. Friction loads associated with axial compression or expansion of the assembly under pressure were small, confirming that metal-to-metal sealing in combination with the further tendency of the largely axial fluid pressure load between the pressured surfaces and the unpressured notch cavity to constrict the interfacial region and control the sealing contact stress distributionwas achieved with minimized contact stress yielding acceptably low overall friction sliding loads for full scale applications.

Figure 5:
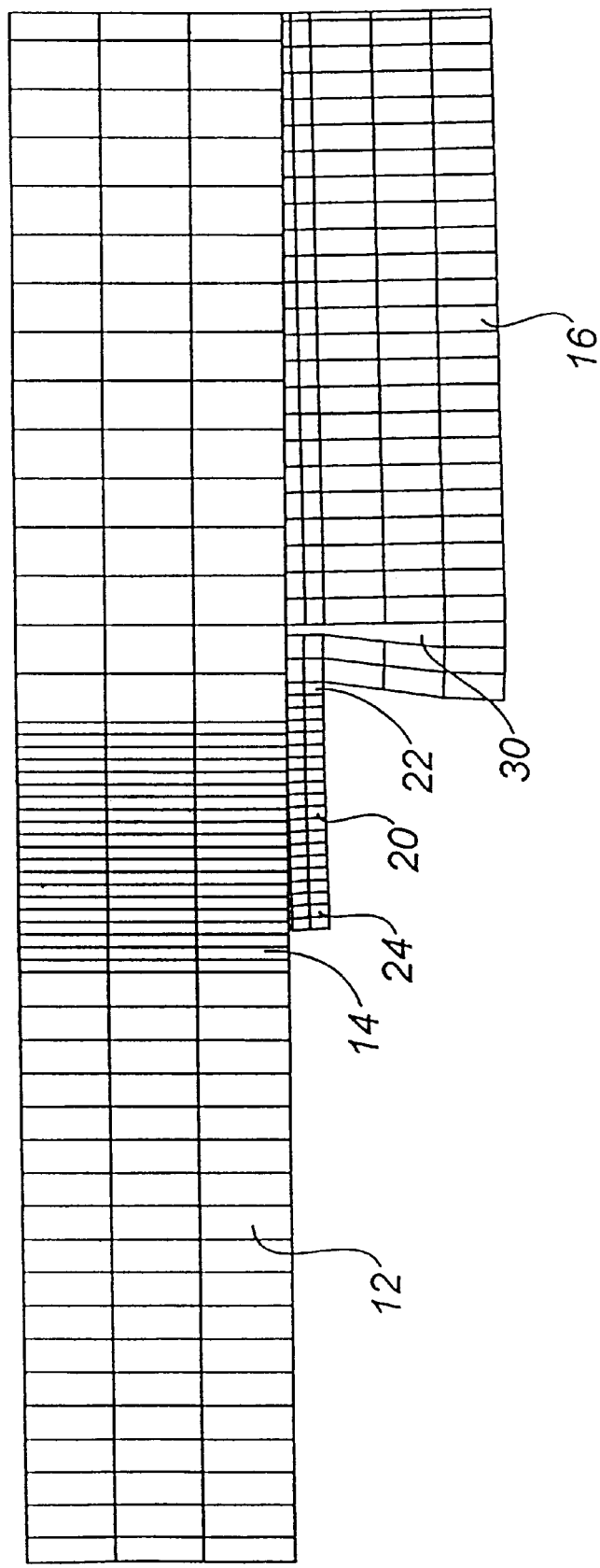
FIG. 5 is a magnified view of the metal-to-metal seal illustrated in FIG. 1, deformed by applied pressure.

A seal geometry incorporating notch 30 but otherwise similar to that used for the physical tests, as shown in FIG. 2, was analyzed using the finite element analysis (FEA) method. The mesh for the model constructed provided an initial gad of 0.00025 inches. The analysis considered the tendency of pressure to penetrate the contact region so that pressure was applied to all inside surfaces up to the seal location. FIG. 5, shows the deformed mesh in the seal region after seal contact has been activated by flow or stress gradients in the grease along the interfacial region. The deformations are exaggerated to better visualize the ability of the gap to control the contact region geometry and hence contact stress distribution under pressure loading.

Figure 6:
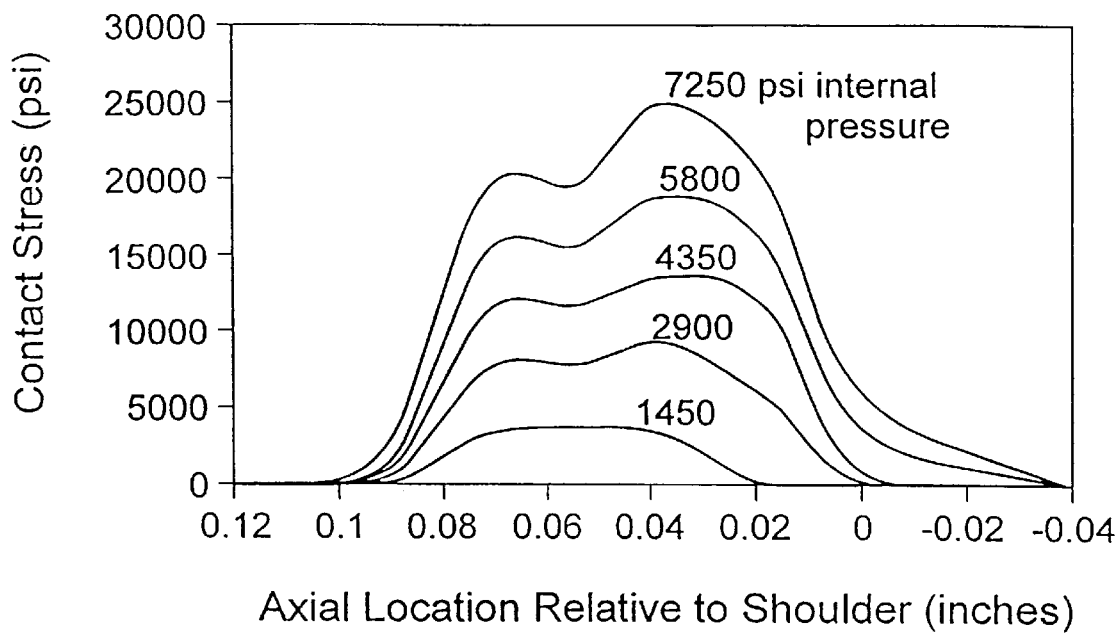
FIG. 6 is a graph setting forth seal contact stress distribution when the metal-to-metal seal is subjected to pressure testing, as illustrated in FIG. 2.
Figure 7:
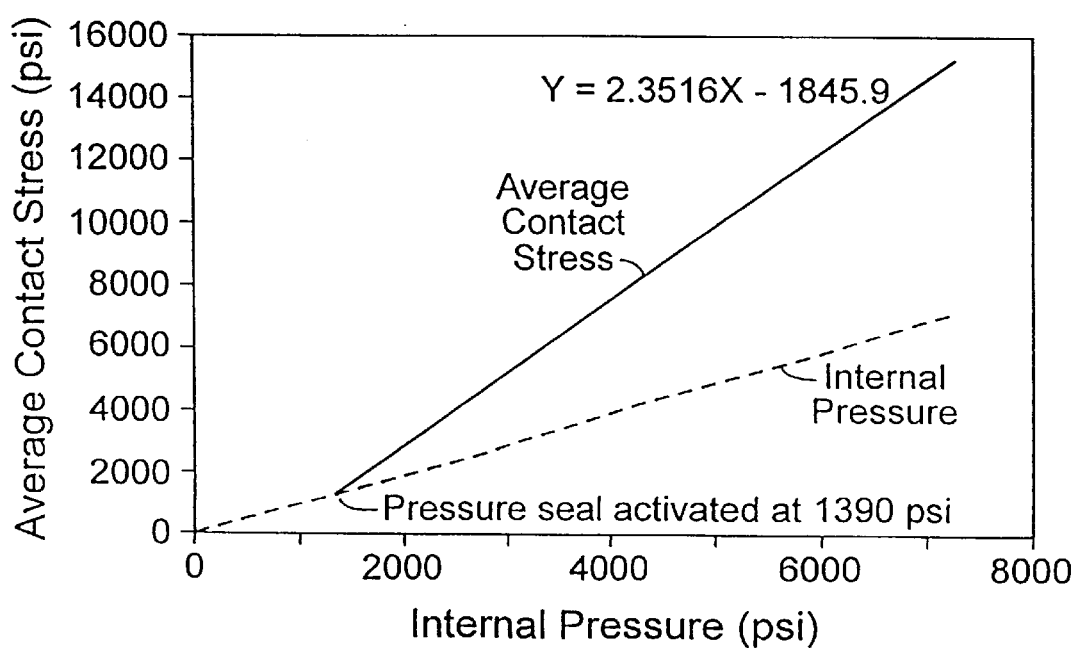
FIG. 7 is a graph setting forth average contact stress as a function of applied pressure when the metal-to-metal seal is subjected to pressure testing, as illustrated in FIG. 2.

FIGS. 6 and 7, provide evaluation of the contact pressure. As shown, a wide seal contact width is achieved so that the low contact stress condition required for sliding is achieved. Also as shown in FIG. 7, because no initial interference was used an activation pressure of 1366 psi is required. Used with the flow equations, this value allows appropriate selection of design parameters governing either the seepage flow or compound seal requirements.

Figure 8:
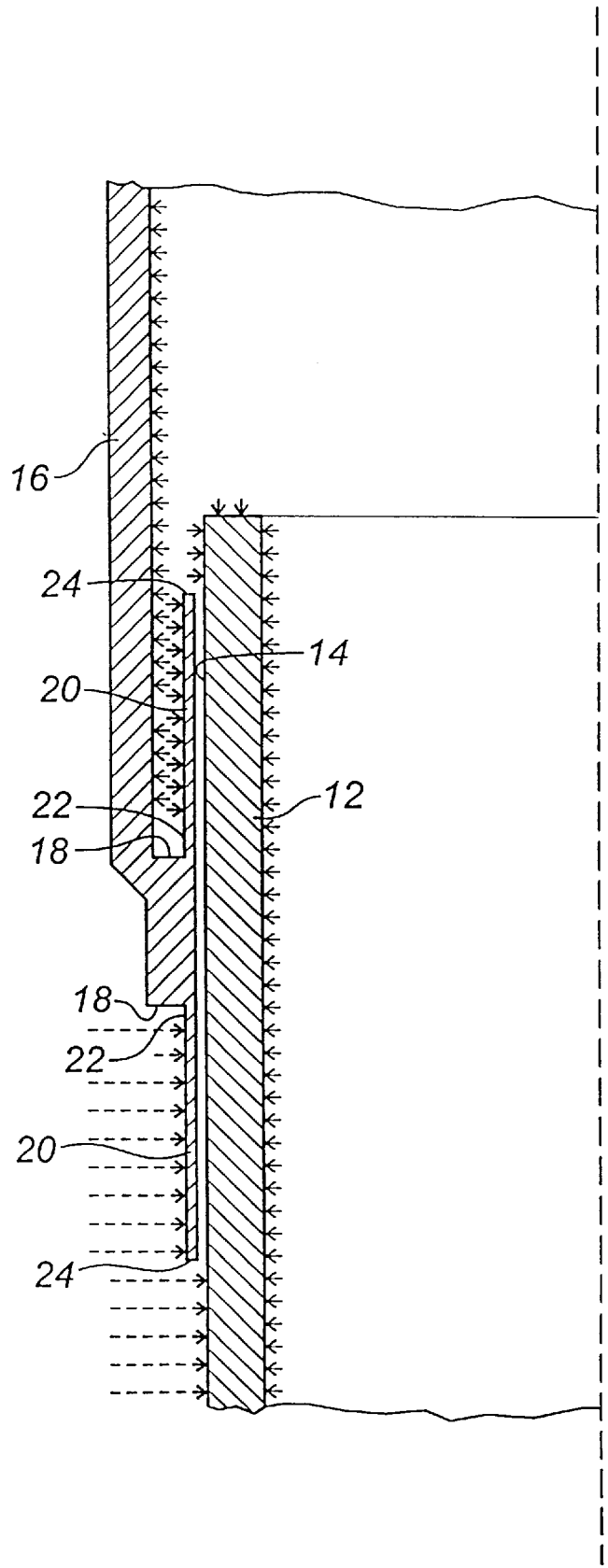
FIG. 8 is a side elevation view, in section, illustrating a first alternative sealing assembly constructed in accordance with the teachings of the present method.
Figure 9:
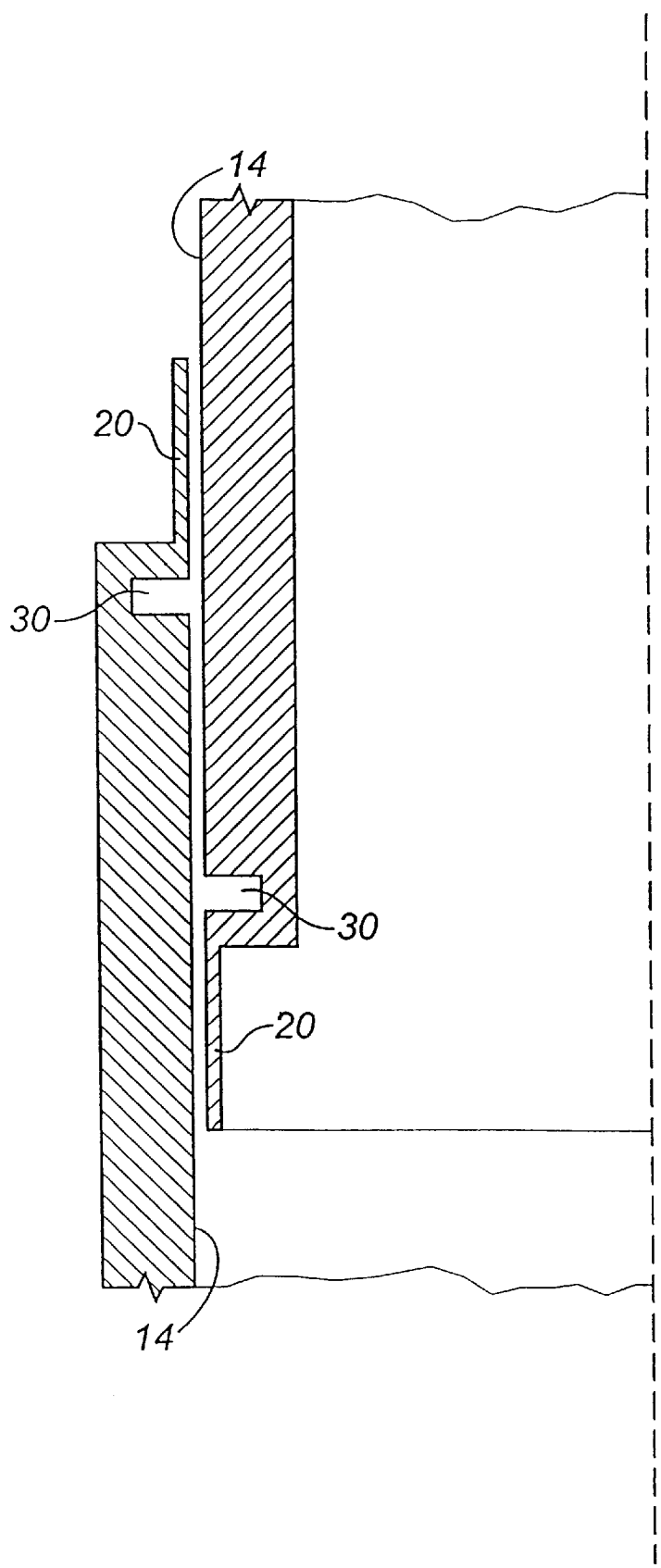
FIG. 9 is a side elevation view, in section, illustrating a second alternative sealing assembly constructed in accordance with the teachings of the present invention.

While FIG. 2 illustrates one form of sealing assembly there are a variety of alternative sealing assemblies that can be constructed using the teachings of the present method. In each case high pressure acts upon sleeve 20. In each case fluid attempts to migrate from an area of high pressure at send end 24 of sleeve 20 toward first end 22. Referring to FIG. 8, there is illustrated a manner in which sleeve 20 can be adapted to seal on an exterior surface of a tubular member with pressure coming from two directions. Referring to FIG. 9, there is illustrated a manner in which two of seal assemblies 10 can be combined., to meet the needs of an application in which pressure is on both sides. Axis of symmetry 51 can be on either side of sleeve 20, as illustrated in FIG. 1.

It will be apparent to one skilled in that art that the present method teaches an effective method of forming a metal-to-metal seal in high pressure applications with low contact stress. It will also be apparent to one skilled in the art that modifications may be made to the illustrated embodiment without department from the spirit and scope of the invention as hereinafter defined in the Claims.

What is claimed is:

1. A sealing apparatus comprising:
    a first tubular pressure containment member having an interior surface of revolution;
    a second tubular pressure containment member having an exterior surface, an interior surface, a remote end, and a thin walled extension sleeve having a thickness, a first end and a second end defining a length and the first end of the thin walled extension sleeve being conjoined with the remote end; and
    the second tubular pressure containment member being telescopically engaged with the first tubular pressure containment member with the thin walled extension sleeve positioned wholly within the first tubular pressure containment member in close relation to the interior surface of revolution and with a continuous gap, between the thin walled extension sleeve and the interior surface of revolution of the first tubular pressure containment member over the length of the thin walled extension sleeve.

2. The sealing apparatus of claim 1, further comprising a narrow axially extending circumferential notch in the exterior surface of the second tubular pressure containment member, near the thin walled extension sleeve, so that axial fluid pressure on the second tubular pressure containment member inner surfaces will deform the notch and cause the thin walled extension sleeve to move towards contact with the first tubular pressure containment member surface of revolution.

3. The sealing apparatus of claim 1, in which, at operating fluid pressure, there is a continuous gap between the thin walled extension sleeve and the first tubular pressure containment member surface of revolution over the length of the thin walled extension sleeve.

4. The sealing apparatus of claim 1, in which the first tubular pressure containment member and the thin walled extension sleeve are disconnected to permit at least one of relative axial and relative rotational movement.

5. The sealing apparatus of claim 1, having the remote end of the second elongate pressure containment member of substantially uniform thickness, the sleeve of substantially uniform thickness, and the first end of the sleeve connected to the remote end of the second elongate pressure containment member over an interval of length not greater than one thickness of the remote end of the second elongate pressure containment member over an interval of length not greater than one thickness of the remote end of the second elongate pressure containment member.

6. The sealing apparatus of claim 1, leaving the thickness and length of the sleeve determined in accordance with the following formula:

$$L > L_1$$

where
$L_1 \geq 0.2 \lambda$, without notch and $L_1 \geq 0.05 \lambda$ with notch, where $$\lambda = \frac{2\pi}{\beta} = \text{characteristic shell wavelength}$$

$$\beta = \sqrt[4]{\frac{3(1-v^2)}{r^2 t^2}} \text{ for cylinders}$$

r=average sleeve radius
t=sleeve wall thickness, and
v=Poisson's ratio.

7. The sealing apparatus of claim 1, having an initial gap between the first pressure containment member and the second pressure containment member and the second pressure containment member, the thickness and length of the sleeve necessary to compensate for such initial gap being determined in accordance with the following formula:

$$L_2 > \frac{\pi r}{Q_{\max} 6 \mu} \int_0^{P_0} g^3 dP$$

where
g=gap size dependent on pressure induced deformations
$\mu$=viscosity
P=annular pressure
$Q_{max}$=minimum allowable seepage flow rate, and
$P_0$=applied differential pressure for maximum flow within operating pressure range.

8. The apparatus according to claim 1, having an initial gap between the first pressure containment member and the second pressure containment member with a weak solid interfacial compound disposed in the interfacial region, the width and length of the sleeve necessary to compensate to such initial gap being determined in accordance with the following formula:

$$L_2 > \frac{1}{2} \int_0^{P_0} \frac{g}{\tau} dP$$

where
g=gap size dependent on pressure induced deformation,
T=allowable static shear strength of interfacial material,
P=annular pressure, and
$P_0$=maximum applied differential pressure.

9. A sealing apparatus comprising:
    a first tubular pressure containment member having an exterior surface of revolution;
    a second tubular pressure containment member having an exterior surface an interior surface, a remote end, and a thin walled extension sleeve having a thickness and a first end and a second end defining a length, the first end of the thin walled extension sleeve being conjoined with the remote end; and
    the second tubular pressure containment member being telescopically engaged with the first tubular pressure containment member with the surface of revolution positioned wholly within the thin walled extension sleeve in close relation to the thin walled extension sleeve and with a continuous gap between the thin walled extension sleeve and the first tubular pressure containment member surface of revolution over the length of the thin walled extension sleeve.

10. The sealing apparatus of claim 9, further comprising a narrow axially extending circumferential notch in the interior surface of the second tubular pressure containment member, near the thin walled extension sleeve so that axial fluid pressure on the second tubular pressure containment member surfaces will deform the notch and tend to deflect the thin walled extension sleeve towards contact with the first tubular pressure containment member surface of revolution.

11. The sealing apparatus of claim 9, in which, at operating fluid pressure, there is a continuous gap between the thin walled extension sleeve and first tubular pressure containment member surface of revolution over the length of the thin walled extension sleeve.

12. The sealing apparatus of claim 9, in which the first tubular pressure containment member and the thin walled extension sleeve are disconnected to permit at least one of relative axial and relative rotational movement.

13. The sealing apparatus of claim 9, having the remote end of the second elongate pressure containment member of substantially uniform thickness, the sleeve of substantially uniform thickness, and the first end of the sleeve connected to the remote end of the second elongate pressure containment member over an interval of length not greater than one thickness of the remote end of the second elongate pressure containment member.

14. The sealing apparatus of claim 9, leaving the thickness and length of the sleeve determined in accordance with the following formula:

$$L > L_1$$

where $L_1 \geq 0.2 \ \lambda$, without notch and $L_1 \geq 0.05 \ \lambda$ with notch, where $$\lambda = \frac{2\pi}{\beta} = \text{characteristic shell wavelength}$$

$$\beta = \sqrt[4]{\frac{3(1 - v^2)}{r^2 t^2}} \text{ for cylinders}$$

r=average sleeve radius
t=sleeve wall thickness, and
v=Poisson's ratio.

15. The sealing apparatus of claim 9, having an initial gap between the first pressure containment member and the second pressure containment member and the second pressure containment member, the thickness and length of the sleeve necessary to compensate for such initial gap being determined in accordance with the following formula:

$$L_2 > \frac{\pi r}{Q_{\max} 6 \mu} \int_0^{P_0} g^3 dP$$

where g=gap size dependent on pressure induced deformations
$\mu$=viscosity
P=annular pressure
$Q_{max}$=minimum allowable seepage flow rate, and
$P_0$=applied differential pressure for maximum flow within operating pressure range.

16. The sealing apparatus of claim 9, having an initial gap between the first pressure containment member and the second pressure containment member with a weak solid interfacial compound disposed in the interfacial region, the width and length of the sleeve necessary to compensate to such initial gap being determined in accordance with the following formula:

$$L_2 > \frac{1}{2} \int_0^{P_0} \frac{g}{\tau} dP$$

where g=gap size dependent on pressure induced deformation,
T=allowable static shear strength of interfacial material,
P=annular pressure, and
$P_0$=maximum applied differential pressure.

* * * * *